United States Patent [19]

Ikegaya et al.

[11] Patent Number: 5,766,324
[45] Date of Patent: Jun. 16, 1998

[54] INK COMPOSITION, PRINTED MATTER, AND THERMAL TRANSFER RECORDING MEDIUM

[75] Inventors: Masahito Ikegaya, Ibaraki; Takanori Kamoto; Yoshinori Yamamoto, both of Takatsuki, all of Japan

[73] Assignee: Hitachi Maxell, Ltd., Osaka-fu, Japan

[21] Appl. No.: 580,245

[22] Filed: Dec. 28, 1995

[30] Foreign Application Priority Data

Dec. 28, 1994 [JP] Japan .................. 6-338402
Dec. 28, 1994 [JP] Japan .................. 6-338624
Mar. 15, 1995 [JP] Japan .................. 7-084845

[51] Int. Cl.$^6$ .................. C09D 11/00; B42D 15/00
[52] U.S. Cl. .................. 106/31.15; 106/31.32; 106/31.64; 283/88
[58] Field of Search .................. 106/20 B, 21 A, 106/22 B, 31.15, 31.32, 31.64; 428/916; 283/88

[56] References Cited

U.S. PATENT DOCUMENTS

| | | | |
|---|---|---|---|
| 3,886,083 | 5/1975 | Laxer | 106/21 A |
| 3,928,226 | 12/1975 | McDonough et al. | 106/21 A |
| 4,015,131 | 3/1977 | McDonough et al. | 106/21 A |
| 4,446,204 | 5/1984 | Kaule et al. | 428/323 |
| 4,869,532 | 9/1989 | Abe et al. | 106/20 B |
| 5,084,205 | 1/1992 | Auslander | 106/22 B |
| 5,135,569 | 8/1992 | Mathias | 106/22 B |
| 5,290,348 | 3/1994 | Auslander | 106/23 R |
| 5,478,381 | 12/1995 | Ohiwa et al. | 106/21 R |

FOREIGN PATENT DOCUMENTS

| | | |
|---|---|---|
| 0 263446 | 4/1988 | European Pat. Off. . |
| 53-9600 | 1/1978 | Japan . |
| 61-18231 | 5/1986 | Japan . |
| 2 231572 | 11/1990 | United Kingdom . |
| 8 103511 | 12/1981 | WIPO . |

*Primary Examiner*—Helene Klemanski
*Attorney, Agent, or Firm*—Birch, Stewart, Kolasch & Birch, LLP

[57] ABSTRACT

A printed matter having substrate, and a datum printed with an infrared fluorescent which is excited by infrared light and emits light in an infrared wavelength range and a datum printed with a black colorant does not absorb light in the infrared wavelength range, or data printed with a black colorant which does not absorb light in the infrared wavelength range and carries thereon an organic material which is excited by infrared light and emits light in an infrared wavelength range, whereby an amount of data printed in a unit area of the substrate is increased.

9 Claims, 1 Drawing Sheet

INK COMPOSITION, PRINTED MATTER, AND THERMAL TRANSFER RECORDING MEDIUM

BACKGROUND OF THE INVENTION

1. Field of the Invention

The present invention relates to an ink composition, a printed matter, and a thermal transfer recording medium. In particular, the present invention relates to an ink composition comprising an infrared fluorescent which is excited by infrared light and emit light in an infrared wavelength range and a black colorant, a printed matter which is printed with such ink composition, and a thermal transfer recording medium.

2. Description of the Related Art

Hitherto, to prevent forgery and to keep secrecy, an infrared light-emitting layer such as a stealth bar code which is invisible to eyes is printed on a printed material such as a catalogue using a marking composition comprising an infrared fluorescent which emits light in the infrared wavelength range, and information in the printed layer such as the bar code is optically read to obtain information on a good such as properties or price, or various personal information.

Such technology is disclosed in, for example, Japanese Patent Publication No. 18231/1986 and Japanese Patent KOKAI Publication No. 9600/1978. Recently, it is proposed to print such infrared light-emitting layer on a plastic substrate such as a prepaid card, an ID card, a magnetic card, etc. or a magnetic layer.

When data which are visible to the eyes should be printed over the printed layer of the infrared fluorescent, the visible date are printed using carbon black. Since the carbon black absorbs the light in the infrared wavelength range, the reading of the infrared light emitted from the printed layer of the infrared fluorescent is interfered.

In many cases, an amount of information stored in the bar code printed with the infrared fluorescent is insufficient.

SUMMARY OF THE INVENTION

An object of the present invention is to provide an ink composition which can color a conventional infrared light-emitting layer without decreasing an intensity of the emitted light, and record data which can be read by the eyes.

Another object of the present invention is to provide a printed material which stores information in an infrared light-emitting layer such as a bar code, and optically readable data such as characters to be read by an optical character reader (OCR) or a conventional black-white bar code, whereby an amount of information or data is increased.

According to a first aspect of the present invention, there is provided an ink composition comprising an infrared fluorescent which is excited by infrared light and emits light in an infrared wavelength range and a black colorant which does not absorb light in the infrared wavelength range.

According to a second aspect of the present invention, there is provide an ink composition comprising a black colorant which does not absorb light in the infrared wavelength range and carries thereon an organic material which is excited by infrared light and emits light in an infrared wavelength range.

According to a third aspect of the present invention, there is provided a printed matter comprising a substrate, and a datum printed with an infrared fluorescent which is excited by infrared light and emits light in an infrared wavelength range and a datum printed with a black colorant which does not absorb light in the infrared wavelength range, wherein two types of data may be printed separately or in the same area.

According to fourth aspect of the present invention, there is provided a printed matter comprising a substrate, and a datum printed with a black colorant which does not absorb light in the infrared wavelength range and carries thereon an organic material which is excited by infrared light and emits light in an infrared wavelength range.

According to a fifth aspect of the present invention, there is provided a thermal transfer recording medium which comprises a support and a layer of an ink composition comprising an infrared fluorescent which is excited by infrared light and emits light in an infrared wavelength range and a black colorant which does not absorb light in the infrared wavelength range.

In a preferred embodiment, the infrared fluorescent is adsorbed on the black colorant.

DETAILED DESCRIPTION OF THE INVENTION

Figure 1:
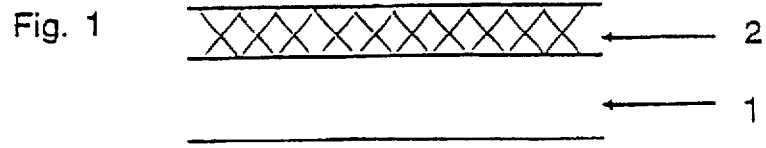
FIG. 1 is a cross sectional view of a first example of the printed material of the present invention.

The ink composition of the present invention comprises an infrared fluorescent which is excited by infrared light and emits light in an infrared wavelength range and a black colorant which does not absorb light in the infrared wavelength range.

As the infrared fluorescent, any one of conventional infrared fluorescents may be used.

In a preferred embodiment, the infrared fluorescent is an inorganic infrared fluorescent which has a high intensity of emitted light. Preferred examples of such inorganic infrared fluorescent are a phosphoric acid base infrared fluorescence of the formula:

$$M^1{}_{1-x-y}Nd_xYb_yPO_4 \qquad (I)$$

wherein $M^1$ is at least one element selected from the group consisting of Al, Bi, B, In, Ga, Sc, Gd, Ce, Y, Lu and La, x is a number of 0 to 0.9, and y is a number of 0 to 0.9, provided that a sum of x and y is larger than 0 (zero) and not larger than 1, an infrared fluorescent of the formula:

$$M^2M^3{}_{1-w-z}Nd_wYb_zP_4O_{12} \qquad (II)$$

wherein $M^2$ is at least one alkali metal element selected from the group consisting of Li, Na, K, Rb and Cs, $M^3$ is at least one element selected from the group consisting of Sc, Y, La, Ce, Gd, Lu, Ga, In, Bi and Sb, w is a number of 0.05 to 0.999, z is a number of 0.001 to 0.950, provided that a sum of w and z is from 0.051 to 1 (one), and a molybdic acid base infrared fluorescent of the formula:

  (III)

wherein $M^1$ is the same as defined above, m is a number of 0 to 2, n is a number of 0 to 2, provided that a sum of m and n is larger than 0 and not larger than 2.

These inorganic fluorescents can be prepared by per se conventional methods, for example, a method disclosed in Japanese Patent KOKAI Publication No. 188599/1995 corresponding to EP-A-0 646 631.

A particle size of the infrared fluorescent is selected according to a kind of a binder resin which is one of the components of the ink composition, and so on, and usually from 0.1 to 20 μm, preferably from 0.1 to 10 μm.

A content of the infrared fluorescent in the ink composition can be changed in a wide range, and usually from 10 to 90 wt. %, preferably from 20 to 85 wt. % of the weight of the ink composition.

As the infrared fluorescent, an organic infrared fluorescent can be used also, as long as it is excited by the infrared light and emits light in the infrared wavelength range. Preferred examples of the organic infrared fluorescent are polymethine dyes, anthraquinone dyes, dithiol metal salt dyes, phthalocyanine dyes, indophenol dyes, azo dyes, and so on.

Specific examples of the polymethine dye are IR-140 and IR-125 (both manufactured by Kodak Laboratories Chemical), IR-820 (manufactured by Nippon Kayaku Co., Ltd.), etc. Specific examples of the anthraquinone dye are IR-750 (manufactured by Nippon Kayaku Co., Ltd.), etc. Specific examples of the dithiol metal salt dye are tetrabutylphosphonium bis(1,2-benzenethiolate) nicolate (III) (manufactured by Mitsui Toatsu Co., Ltd.), etc. Specific examples of the phthalocyanine dye are Zn-phthalocyanine, etc. Among them, IR-125, IR-140, IR-750 and IR-820 are preferred since they have a high intensity of emitted light per unit weight.

To improve weather resistance of the organic infrared fluorescent, the infrared fluorescent dye is adsorbed on a nucleus particle. As the nucleus particle, a polymer particle is preferably used. For example, fine particles of polymethacrylate, polyacrylate, benzoguanamine resin, urea resin, vinyl chloride-vinyl acetate copolymer, alkyd resin, etc. are preferred. A part or whole of the particles may be hollow particles including a solvent therein.

Further, as the nucleus particle, inorganic particles which are covered with a polymer such as above may be used.

Specific examples of the nucleus particles are MICROGEL (manufactured by Nippon Paint Co., Ltd.), ACRYL EMULSION (manufactured by Rohm and Haas), nucleus particles manufactured by Nippon Synthetic Rubber Co., Ltd., CHEMIPEARL (manufactured by Mitsui Petrochemical Co., Ltd.), and so on. Specific examples of the hollow particles are Hollow Particle SX 863 (A), SX 864 (B) and SX 865 (B) (all manufactured by Nippon synthetic Rubber Co., Ltd.), Hollow Particles OP-62, OP-84J and HP-91 (all manufactured by Rohm & Haas), and so on. Specific examples of the inorganic particles covered with the polymer are Organosilica Sol CX-SZ series, etc.

The infrared fluorescent dye may be adsorbed on the nucleus particles by any of conventional methods such as a bulk resin grinding method, an emulsion polymerization method, a resin precipitation method, and so on.

The bulk resin grinding method comprises mixing the infrared fluorescent dye, an optionally used fluorescent brightener, and the nucleus particles, drying the mixture to obtain a solid material, and then grinding the solid material. The emulsion polymerization method comprises preparing the nucleus particles by emulsion polymerization, and adding the infrared fluorescent dye and the optional white fluorescent brightener to a suspension of the nucleus particles to adsorb the fluorescent dye and the fluorescent brightener on the particles.

An amount of the infrared fluorescent dye is not limited. To obtain a sufficient amount of emitted fluorescent light, the amount is preferably from 0.001 to 20 wt. % based on the weight of the nucleus particles.

A particle size of the infrared fluorescent dye adsorbed on the nucleus particles is selected according to the kind of the binder resin, and so on, and usually from 10 nm to 20 μm, preferably from 10 nm to 10 μm.

A content of the infrared fluorescent adsorbed on the nucleus particles in the ink composition can be changed in a wide range, and a total amount of the infrared fluorescent and the nucleus particles is usually from 10 to 90 wt. %, preferably from 10 to 80 wt. % of the weight of the ink composition.

In the present invention, the black colorant which does not absorb light in the infrared wavelength range may be a black pigment or a black dye, as long as a high print contrast signal (PCS) is achieved. In view of weather resistance, and other properties, the black pigment is preferred.

Examples of the commercially available black pigment are Chromo Fine Black A-1103 (manufactured by Dainichi Seika Co., Ltd.), PALIOGEN BLACK (manufactured by BASF), and so on.

An amount of the black colorant is determined according to the kind of the colorant and so on. When the black colorant is solely used, its amount is from 5 to 80 wt. %, preferably from 10 to 60 wt. % based on the weight of the ink composition. When the black colorant is used in combination with the infrared fluorescent, an amount of the black colorant is from 1 to 50 wt. %, preferably from 3 to 30 wt. % based on the weight of the ink composition.

It is possible to adsorb an organic material which is excited by infrared light and emits light in the infrared wavelength range on the above black colorant. In this case, as such organic material, any organic material that is excited by infrared light and emits light in the infrared wavelength range may be used. Preferably, the above described polymethine dyes, anthraquinone dyes, dithiol metal salt dyes, phthalocyanine dyes, indophenol dyes, azo dyes, and so on can be used.

The black colorant on which the above infrared fluorescent dye is adsorbed may be prepared by dropwise adding a solution of the infrared fluorescent in a solvent to a dispersion of the black colorant to adhere the infrared fluorescent on the black colorant.

An amount of the organic material which is excited by infrared light and emits light in the infrared wavelength range to be absorbed on the black colorant is not limited. Preferably, this amount is from 0.001 to 10 wt. % based on the weight of the black colorant. When this amount is less than 0.001 wt. %, the intensity of the emitted light from the ink composition or the printed material is too small. When this amount exceeds 10 wt. %, concentration quenching may occur and then an intensity of the emitted light may be decreased.

As a binder resin which binds the infrared fluorescent, the black colorant or the composite of the black colorant and the infrared fluorescent, any one of resins which are conventionally used as binder resins such as water soluble resins, UV curable resins, and so on may be used depending on the kinds and/or particle sizes of the infrared fluorescent and/or the black colorant.

Preferred examples of the water soluble resin are polyvinyl alcohol, polyvinylpyrrolidone, carboxymethylcellulose, starch, poly acrylate, polymethyl acrylate, and the like. As a solvent, water is used. When the water soluble resin is used, the infrared fluorescent may have a relatively large particle size of, for example, 7 μm or larger.

When the ink composition comprising the water soluble resin is used in an ink jet printer, an acrylic polymer, polyvinyl alcohol, polyvinylpyrrolidone, polyethylene glycol, and so on is preferably used. In this case, as a solvent, water, an alcohol (e.g. ethanol), a ketone (e.g. methyl ethyl ketone), an ester, an ether, and so on is used independently or in admixture. Further, an electric conductivity adjusting agent such as $LiNO_3$, $LiCl$, $KNO_3$, and the like may be added to the ink composition. If desired, other additive such as an anti-foaming agent, a dispersant, a surfactant, a humectant, a dye, other fluorescent dye, and so on may be added to the ink composition.

As the UV curable resin, a polyfunctional acryloyl group pendant type UV curable resin such as polyepoxy acrylate, polyester acrylate, polyether acrylate, polyurethane acrylate, polyacryl alkylate, alkyd acrylate, etc. can be used.

In particular, when the fine particle infrared fluorescent having a particle size of 0.1 to 1 μm is used, and the ink composition is printed on a porous substrate such a paper sheet, the fine particle infrared fluorescent penetrate the porous substrate, so that the infrared fluorescent does not perform its function. But, when the UV curable resin is used as the binder, it is quickly cured and effectively prevents the penetration of the fine particle infrared fluorescent in the porous substrate. Therefore, with the fine particle infrared fluorescent, the UV curable resin is preferably used.

As a resin other than the water soluble resin and the UV curable resin, a polyurethane resin, a polyester resin, an acrylic resin, a polycarbonate resin, a polyvinyl butyral resin, a polystyrene resin, an acrylsilicone resin, an alkyd resin, an ethylene-vinyl acetate copolymer, an epoxy resin, a phenoxy resin, or their modified products are used independently or in admixture. With such other binder resin is used, the infrared fluorescent having a particle size of 0.1 to 10 μm is preferably used.

The ink composition of the present invention may be prepared by a per se conventional method. For example, the infrared fluorescent, the black colorant, the binder resin, the solvent and other optional additives are mixed and dispersed. Amounts of the binder resin and the solvent may be adjusted according to a handling property, a printing property, and film properties after printing.

The prepared ink composition is printed on a substrate by a suitable method such as screen printing, offset printing, gravure printing, letter press printing, padding printing, and the like, or with an ink jet printer, to obtain a printed material carrying the colored infrared light-emitting layer. This printed material can be used as a prepaid card, an ID card or a magnetic card on which the data in the infrared light-emitting layer and the date which can be read optically by eyes or the OCR are printed at the same time.

When the ink composition of the present invention is printed with the ink jet printer, a viscosity and redispersibility of the ink composition should be taken into account. Then, the organic infrared fluorescent is preferably used. Since the organic infrared fluorescent has a smaller specific gravity than the inorganic infrared fluorescent, it is advantageously used in the ink jet printer which draws an image by the formation of droplets of the ink composition by interrupting an ink jet flow.

In particular, since the infrared fluorescent adsorbed on the nucleus particles or the black colorant has properties of a pigment, the ink composition comprising such composite can form a clear image without blur on any type of substrate.

In the printed material, a thickness of the colored infrared light-emitting layer is preferably from 1 to 20 μm, more preferably from 2 to 8 μm in the case of screen printing, or preferably from 0.2 to 4 μm, more preferably from 0.5 to 2 μm in the case of offset printing, gravure printing and letter press printing. In the case of padding printing, the thickness is preferably from 0.2 to 10 μm, more preferably from 0.5 to 5 μm.

When the ink composition comprising a meltable binder resin, a thermal transfer recording material such as an ink ribbon can be produced by coating the ink composition on a support such as a polyethylene terephthalate film and drying it to form an ink composition layer on the support. When the ink composition is thermal transferred on the printing substrate such as the paper sheet, the colored infrared light-emitting layer is printed, and the same printed material as explained above can be obtained.

Examples of the meltable binder resin are wood wax (Japan wax), bees wax, synthetic wax, acrylic resin, polyurethane resin, polyester resin, vinyl chloride resin, and so on. In this case, preferably the used infrared fluorescent has a particle size of 0.1 to 1 μm. A thickness of the ink composition layer is usually from 1 to 10 μm, preferably from 1 to 5 μm. When the thickness of the ink composition layer is smaller than 1 μm, an output is too small, while when it exceeds 10 μm, the ink composition layer becomes fragile so that it may be peeled off from the support.

In addition to the printed material having the colored infrared light-emitting layer, the present invention can provide a printed material in which data in an infrared light-emitting layer and data which can be optically read by the eyes or the OCR such as the character or the bar code are laminated using the ink composition or the thermal transfer recording material comprising the infrared fluorescent and the ink composition or the thermal transfer recording material comprising the black colorant, whereby an amount of data on the printed material can be increased.

The order of the printing of the black colorant layer and the infrared light-emitting layer is arbitrary. The black colorant and the infrared fluorescent to be used in this embodiment are the same as those described above. In the preparation of the ink composition, the same binder resin, solvent, and other additives as explained above are used. Also, the printing method is the same as above.

Some embodiments of the printed material of the present invention will be explained by making reference to the drawings.

FIG. 1 is a cross sectional view of a first example of the printed material of the present invention, which comprises a substrate 1, and an ink layer containing the black colorant and the infrared fluorescent.

Figure 2:
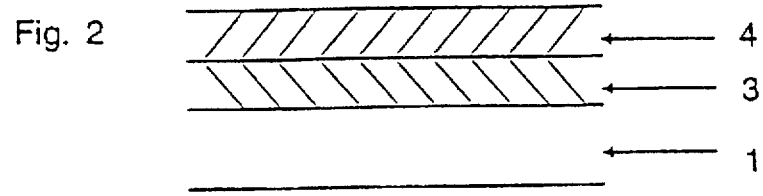
FIGS. 2 and 3 are cross sectional views of second and third examples of the printed material of the present invention, respectively.
Figure 3:
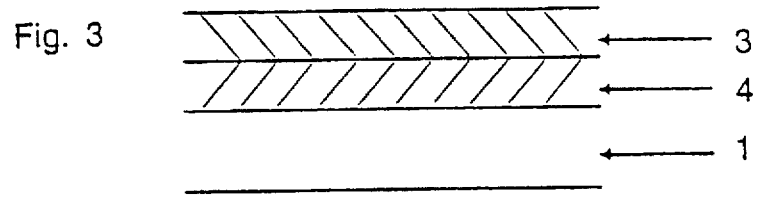

FIGS. 2 and 3 are cross sectional views of second and third examples of the printed material of the present invention, each of which comprises a substrate 1, an ink layer comprising the black colorant 3, and a layer comprising the infrared fluorescent 4, wherein two layers are laminated.

Figure 4:
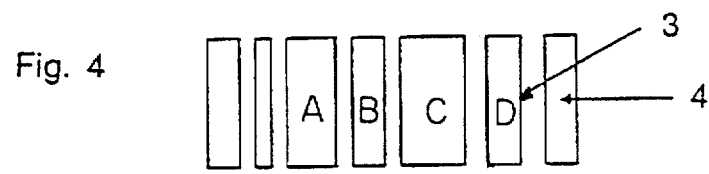
FIG. 4 shows a printing manner of a bar code and characters.

FIG. 4 shows a printing manner of a bar code and characters, in which the bar code is formed by the layer comprising the infrared fluorescent 4, and the characters are formed from the ink composition comprising the black colorant 3 in the same area of the printing substrate.

Figure 5:
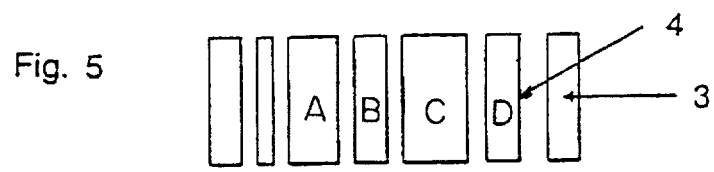
FIG. 5 shows another printing manner of a bar code and characters.

FIG. 5 shows another printing manner of a bar code and characters, in which the bar code is formed from the ink composition comprising the black colorant 3, and the characters are formed from the infrared fluorescent 4. The bar code can be read by the OCR, while the characters are identified by irradiating the IR light and detecting the emitted IR light.

Figure 6:
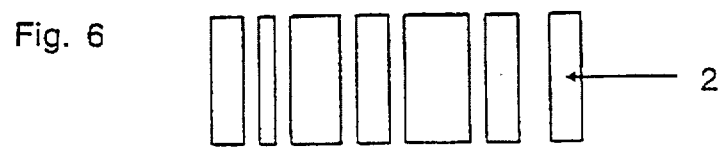
FIG. 6 shows a printing manner of a bar code.

FIG. 6 shows a further printing manner of a bar code, in which the bar code is formed from an ink composition containing both the black colorant and the infrared fluorescent. This bar code cannot be distinguished from the conventional black-white bar code containing no infrared fluorescent by the eyes or the OCR, but can be distinguished from the conventional black-white bar code when the IR light is irradiated. Then, if the bar code of FIG. 6 is replaced by the conventional black-white bar code for the purpose of forgery, the replacement can be found by irradiating the IR light and checking the presence of the emitted light. Thereby, the security of the bar code is improved.

Figure 7:
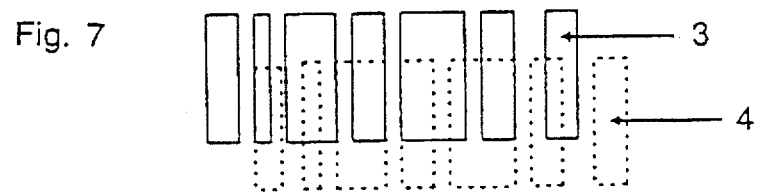
FIG. 7 shows a printing manner of bar codes.

FIG. 7 shows a yet another printing manner of bar codes, in which one bar code is formed from the ink composition comprising the black colorant 3, while the other bar code is formed from the infrared fluorescent 4, whereby the amount of the recorded data are doubled.

EXAMPLES

The present invention will be illustrated by the following Examples, which do not limit the scope of the present invention in any way.

In Examples, "parts" are "parts by weight".

Example 1

The following components were mixed and dispersed in a sand mill for one hour:

| | |
|---|---|
| Infrared fluorescent | 43.4 parts |
| ($Nd_{0.1}Yb_{0.1}Y_{0.8}PO_4$, particle size of 0.8 μm) | |
| Black colorant | 5 parts |
| (Chromo Fine Black A-1103 manufactured by Dainichi Seika Co., Ltd.) | |
| Vinyl chloride-vinyl acetate-vinyl alcohol copolymer | 11 parts |
| (VAGH manufactured by U.C.C., USA) | |
| Cyclohexanone | 38.5 parts |
| Butylcellosolve | 4.4 parts |
| Dodecylamine | 1 part |

To the mixture, a trifunctional low molecular weight isocyanate compound (COLONATE L manufactured by Nippon Polyurethane Industries, Ltd.) (1.1 parts) was added and mixed and dispersed for 0.5 hour to obtain an ink composition.

This ink composition was coated on a paper sheet by screen printing to form a bar code. The colored infrared light-emitting layer had a thickness of 5.5 μm.

Example 2

The following components were mixed and dispersed with three-roll mill for one hour to obtain an ink composition:

| | |
|---|---|
| Infrared fluorescent | 33.5 parts |
| ($Nd_{0.1}Yb_{0.1}Y_{0.8}PO_4$, particle size of 0.5 μm) | |
| Black colorant | 4 parts |
| (PALIOGEN BLACK manufactured BASF) | |
| UV curable resin: aliphatic pentafunctional acrylate | 18 parts |
| (NOPCOMER 4510 manufactured by SANNOPCO) | |
| UV curable resin: aliphatic trifunctional acrylate | 10.6 parts |
| (PHOTOMER 4149 SN manufactured by Henkel) | |
| UV curable resin: polyurethane base trifunctional acrylate | 44.4 parts |
| (PHOTOMER 6008 manufactured by Henkel) | |
| Photopolymerization initiator | 2.1 parts |
| (IRGACURE 907 manufactured by Ciba-Geigy) | |
| Photopolymerization initiator | 3.1 parts |
| (DALOCURE 1173 manufactured by EM Chemical) | |
| Dodecylamine | 0.5 part |
| Diphenyl-2-methacryloyloxyethyl phosphate | 0.5 part |

This ink composition was coated on a paper sheet by offset printing to form a bar code. The colored infrared light-emitting layer had a thickness of 1.2 μm.

Example 3

The following components were mixed and dispersed in a ball mill for 6 hours to obtain an ink composition:

| | |
|---|---|
| Black colorant | 4 parts |
| (Chromo Fine Black A-1103 manufactured by Dainichi Seika Co., Ltd.) | |
| Acrylic copolymer | 1 parts |
| (JONCRYL 52 manufactured by Johnson Polymer) | |
| Anti-foaming agent | 0.01 part |
| Water | 20 parts |

Separately, to an emulsion polymerization liquid of a styrene-acrylate copolymer (solid content: 30 wt. %) (100 parts), a solution of a polymethine dye (IR-140 manufactured by Kodak Laboratories Chemical) (0.3 part) dissolved in dimethylsulfoxide (3 parts) was added and mixed to obtain a dispersion of the infrared fluorescent. The dispersion (50 parts), an acrylic acid copolymer (JONCRYL 52 manufactured by Johnson Polymer) (20 parts), an antifoaming agent (0.01 part) and water (60 parts) were mixed and dispersed in a ball mill for 6 hours to obtain a marking composition comprising the infrared fluorescent.

The ink composition and the marking composition were mixed and dispersed in the ball mill for one hour to obtain an ink composition.

Using this ink composition, a bar code was printed on a paper sheet with an ink jet printer (GX-PA manufactured by Hitachi Ltd.).

Example 4

A black colorant (Chromo Fine Black A-1103 (manufactured by Dainichi Seika Co., Ltd.) (10 parts), an acrylic copolymer (JONCRYL 61 manufactured by Johnson Polymer) (7 parts) and water (7 parts) were mixed and dispersed in a ball mill for 10 hours. To the mixture, a solution of a polymethine dye (IR-820 manufactured by Nippon Kayaku Co., Ltd.) (0.02 part) dissolved in ethanol (1 part) was dropwise added and stirred for 1 hour, followed by filtration to obtain a dispersion of a black colorant carrying the infrared fluorescent.

To the filtrate, water (30 parts) was added and mixed to obtain an ink composition.

Using this ink composition, a bar code was printed on a paper sheet with an ink jet printer (GX-PA manufactured by Hitachi Ltd.).

Example 5

In the same manner as in Example 1 except that no black colorant was used, and an amount of the infrared fluorescent was changed to 48.4 parts, an ink composition was prepared.

This ink composition was coated on a paper sheet by screen printing. The formed infrared light-emitting layer had a thickness of 4.5 μm.

Separately, in the same manner as in Example 1 except that no infrared fluorescent was used, and an amount of the black colorant was changed to 48.4 parts, an ink composition was prepared.

This ink composition was coated over the above printed infrared fluorescent layer by screen printing to form a bar code. The colored layer of the bar code had a thickness of 4.8 82 m.

Example 6

The following components were mixed and dispersed in a ball mill for 6 hours to obtain an ink composition:

| | |
|---|---|
| Black colorant | 4 parts |
| (PALIOGEN BLACK manufactured by BASF) | |
| Acrylic copolymer | 2 parts |
| (JONCRYL 61 manufactured by Johnson Polymer) | |
| Anti-foaming agent | 0.01 part |
| Water | 20 parts |

Using this ink composition, a bar code was printed on a paper sheet with a jet ink printer.

Separately, to an emulsion polymerization liquid of a styrene-acrylate copolymer (solid content: 30 wt. %) (100 parts), a solution of a polymethine dye (IR-820 manufactured by Nippon Kayaku Co., Ltd.) (0.6 part) dissolved in dimethylsulfoxide (1.5 parts) was added and mixed to obtain a dispersion of the infrared fluorescent. The dispersion (50 parts), an acrylic copolymer (JONCRYL 61 manufactured by Johnson Polymer) (10 parts), an anti-foaming agent (0.01 part) and water (60 parts) were mixed and dispersed in a ball mill for 6 hours to obtain a marking composition comprising the infrared fluorescent.

The marking composition was coated over the colored layer of the bar code with an ink jet printer.

Example 7

The following components were melt mixed to obtain an ink composition:

| | |
|---|---|
| Infrared fluorescent | 56 parts |
| ($Nd_{1.9}Yb_{0.1}Ca_5(MoO_4)_8$, particle size of 0.5 μm) | |
| Black colorant | 6.5 parts |
| (Chromo Fine Black A-1103 manufactured by Dainichi Seika Co., Ltd.) | |
| Bees wax | 40 parts |
| Dodecylamine | 5 parts |

The ink composition was coated on a polyethylene terephthalate film having a thickness of 5 μm to a dry thickness of 3 μm and dried to form an ink composition layer. The film was cut to obtain an ink ribbon.

From this ink ribbon, the ink composition was thermal transferred to a paper sheet to print a bar code.

Comparative Example 1

In the same manner as in the preparation step of the ink composition of Example 1 except that carbon black (Printex 140 U manufactured by Degussa, Germany) was used in place of the black colorant, an ink composition was prepared. Using this ink composition, a bar code was printed on a paper sheet by screen printing.

Comparative Example 2

In the same manner as in the preparation step of the ink composition of Example 2 except that carbon black (Special Black 350 manufactured by Degussa, Germany) was used in place of the black colorant, an ink composition was prepared. Using this ink composition, a bar code was printed on a paper sheet by offset printing.

Comparative Example 3

In the same manner as in the preparation step of the ink composition of Example 4 except that carbon black (MA-100 manufactured by Mitsubishi Chemical) was used in place of the black colorant, an ink composition was prepared. Using this ink composition, a bar code was printed on a paper sheet with an ink jet printer.

Comparative Example 4

In the same manner as in the preparation step of the ink composition of Example 5 except that carbon black (Printex 140 U manufactured by Degussa, Germany) was used in place of the black colorant, an ink composition for a colored layer was prepared. Using this ink composition, a printed material having the laminated layers was produced.

Comparative Example 5

In the same manner as in the preparation step of the ink ribbon of Example 7 except that carbon black (MA-100 manufactured by Mitsubishi Chemical) was used in place of the black colorant, an ink ribbon was prepared. Using this ink ribbon, the ink composition was thermal transferred on a paper sheet to form a bar code.

With each of the printed materials produced in Examples and Comparative Examples, an intensity of emitted infrared light was measured as follows:

Infrared light having a wavelength of 810 nm was irradiated on the printed layer to excite the infrared fluorescent, and then the emitted light was detected with a silicon detector having a peak sensitivity at 980 nm. The intensity of the emitted light was expressed with that of Example 1 being 100.

With each of the bar codes printed in Examples and Comparative Examples, readability was checked with a bar code tester (CODASCAN II manufactured by DATA LOGIC). At the same time, a PCS value, which represents a degree of a concentration of a printed image was also measured.

The results are shown in the Table.

TABLE 1

| Ex. No. | Intensity of emitted light | Readability of bar code | PCS value |
|---|---|---|---|
| Ex. 1 | 100 | ○ | 0.93 |
| Ex. 2 | 12 | ○ | 0.91 |
| Ex. 3 | 16 | ○ | 0.92 |
| Ex. 4 | 11 | ○ | 0.90 |
| Ex. 5 | 105 | ○ | 0.94 |
| Ex. 6 | 15 | ○ | 0.91 |
| Ex. 7 | 56 | ○ | 0.92 |
| C. Ex. 1 | 0 | ○ | 0.95 |
| C. Ex. 2 | 0 | ○ | 0.94 |
| C. Ex. 3 | 0 | ○ | 0.92 |
| C. Ex. 4 | 0 | ○ | 0.96 |
| C. Ex. 5 | 0 | ○ | 0.94 |

According to the present invention, the conventional infrared light-emitting layer is colored to record data or image which can be read by the eyes, and the bar code information of the infrared light-emitting layer and the optically readable information of, for example, the conventional black-white bar code can be recorded in the laminated form, whereby the amount of information is increased.

What is claimed is:

1. An ink composition comprising an infrared fluorescent which is excited by infrared light and emits light in an infrared wavelength range and a black colorant which does not absorb light in the infrared wavelength range.

2. An ink composition comprising an infrared fluorescent which is excited by infrared light and emits light in an infrared wavelength range and a black colorant which does not absorb light in the infrared wavelength range;

wherein said infrared fluorescent is at least one inorganic infrared fluorescent selected from the group consisting of a phosphoric acid base infrared fluorescence of the formula:

$$M^1{}_{1-x-y}Nd_xYb_yPO_4 \qquad (I)$$

wherein $M^1$ is at least one element selected from the group consisting of Al, Bi, B, In, Ga, Sc, Gd, Ce, Y, Lu and La, x is a number of 0 to 0.9, and y is a number of 0 to 0.9, provided that a sum of x and y is larger than 0 (zero) and not larger than 1, an infrared fluorescent of the formula:

$$M^2M^3{}_{1-w-z}Nd_wYb_zP_4O_{12} \qquad (II)$$

wherein $M^2$ is at least one alkali metal element selected from the group consisting of Li, Na, K, Rb and Cs, $M^3$ is at least one element selected from the group consisting of Sc, Y, La, Ce, Gd, Lu, Ga, In, Bi and Sb, w is a number of 0.05 to 0.999, z is a number of 0.001 to 0.950, provided that a sum of w and z is from 0.051 to 1 (one), and a molybdic acid base infrared fluorescent of the formula:

$$M^1{}_{2-m-n}Nd_mYb_nCa_5(MoO_4)_8 \qquad (III)$$

wherein $M^1$ is the same as defined above, m is a number of 0 to 2, n is a number of 0 to 2, provided that a sum of m and n is larger than 0 and not larger than 2.

3. The ink composition according to claim 1, wherein said infrared fluorescent is an organic infrared fluorescent and carried on nucleus particles.

4. An ink composition comprising a black colorant which does not absorb light in the infrared wavelength range and carries thereon an organic material which is excited by infrared light and emits light in an infrared wavelength range.

5. A printed matter comprising substrate, and a datum printed with an infrared fluorescent which is excited by infrared light and emits light in an infrared wavelength range and a datum printed with a black colorant which does not absorb light in the infrared wavelength range.

6. The printed matter according to claim 5, wherein two types of data are printed in the same area on the surface of said substrate.

7. A printed matter comprising a substrate, and a datum printed with a black colorant which does not absorb light in the infrared wavelength range and carries thereon an organic material which is excited by infrared light and emits light in an infrared wavelength range.

8. A thermal transfer recording medium comprising a support and a layer of an ink composition comprising an infrared fluorescent which is excited by infrared light and emits light in an infrared wavelength range and a black colorant which does not absorb light in the infrared wavelength range.

9. A thermal transfer recording medium comprising a support and a layer of an ink composition comprising a black colorant which does not absorb light in the infrared wavelength range and carries thereon an organic material which is excited by infrared light and emits light in an infrared wavelength range.

* * * * *